United States Patent
Fields Trainor

(10) Patent No.: US 10,743,530 B2
(45) Date of Patent: Aug. 18, 2020

(54) ANIMAL ALARM AA-100

(71) Applicant: Darlene C. Fields Trainor, Montrose, CO (US)

(72) Inventor: Darlene C. Fields Trainor, Montrose, CO (US)

( * ) Notice: Subject to any disclaimer, the term of this patent is extended or adjusted under 35 U.S.C. 154(b) by 0 days.

(21) Appl. No.: 15/932,401

(22) Filed: Feb. 26, 2018

(65) Prior Publication Data
US 2019/0313629 A1    Oct. 17, 2019

Related U.S. Application Data

(60) Provisional application No. 62/600,312, filed on Apr. 17, 2017.

(51) Int. Cl.
| | |
|---|---|
| *B60Q 5/00* | (2006.01) |
| *G08G 1/16* | (2006.01) |
| *A01M 29/16* | (2011.01) |
| *B60Q 9/00* | (2006.01) |
| *A01K 29/00* | (2006.01) |

(52) U.S. Cl.
CPC ............. *A01M 29/16* (2013.01); *B60Q 5/006* (2013.01); *A01K 29/00* (2013.01); *B60Q 9/008* (2013.01); *G08G 1/16* (2013.01)

(58) Field of Classification Search
CPC ........ A01M 29/16; A01M 29/10; B06Q 5/006
USPC ............... 340/873.2–3; 701/2; 290/55
See application file for complete search history.

(56) References Cited

U.S. PATENT DOCUMENTS

| | | | | |
|---|---|---|---|---|
| 2003/0071735 A1* | 4/2003 | Hanson | ................ | A01M 29/16 340/573.2 |
| 2011/0144829 A1* | 6/2011 | Kim | ..................... | A01M 29/10 701/2 |
| 2013/0249218 A1* | 9/2013 | Vassilev | ............... | A01M 29/16 290/55 |

* cited by examiner

*Primary Examiner* — Albert K Wong
(74) *Attorney, Agent, or Firm* — Leyendecker & Lemire, LLC

(57) ABSTRACT

The invention Animal Alarm AA-100 was designed to meet a required need that is not currently on the market. The unit designates animals approaching through picture motion detection the danger of a roadway when a vehicle is present. It is designed to have a "silent" alarm to be sounded at a high pitch that the animal can hear it to deter the animal from crossing. The unit also through radar detection, noise and motion detection with a micro phone through computer identifies a vehicle approaching the unit. The alarm does not sound in times that no danger is present. The invention does not create a intolerance for those that are near it, but is designed to alleviate carnage from the death of animals hit by a vehicle.

This invention the Animal Alarm AA-100 was designed with the idea of multi-tasking for research with data information, for accuracy of unit function, and to alleviate death by animal vehicle collision. Current products and applications do not cover this inventions support and authenticity of function. Computer programming and recording is also part of the product invention to upgrade if needed in the future. This statement and invention of the Animal Alarm AA-100 was and is my sole invention. Inventor is one individual with three names identifying the same individual. I Darlene C. Fields Trainor, I Darlene Caroline Fields Trainor and I Darlene C. Trainor have invented the Animal Alarm AA-100.

7 Claims, 2 Drawing Sheets

ANIMAL ALARM AA-100

DESCRIPTION OF ANIMAL ALARM AA-100

4 motion detection infra red indicators two in the front, two in the back.

2 cameras (1) on the front and (1) on the back of the unit.

4 motion detection on the bottom, two in the front of the unit and two in the back.

There is a total of 5 Animal alarms sounded to alarm the animal to stay still or retreat. Three in the back of the unit and two in the front of the unit.

Two different locations for the noise detection in the middle bottom area on the front of the unit and on the back. There is an additional radar detection and microphone indicator to enhance the capability of picking of the noise from a vehicle. This is deciphered by the computer to indicate and put into motion the silent alarm if an animal is detected in the current vicinity of the unit.

4 solar panels on the right side of the unit.

4 solar panels on the left side of the unit.

4 solar panels on the top of the unit.

There is a battery back up unit to assist on days without daylight that makes the unit still perform. The computer will indicate a generated email when the battery is low, when the solar energy is ineffective, and send an alert when not performing or recording data correctly.

The unit is covered by a plexiglass box that has a 45 degree slope, that has a toggle switch to rotate it to alleviate any obstruction on the top. In the event that snow builds there is copper wiring that flows through a fire retardant tube to heat up the top of the unit to melt off the moisture should the outdoor temperature fall below 34 degrees.

This is part of the computer programming to identify outdoor temperature, or precipitation present.

The unit is on top of a pole that can rotate 360 degrees to cover all areas around the unit, if required. It can also identify if the silent alarm fails to be triggered, or data that through visual camera and recording animal/vehicle presence failing. This can occur if the unit loses all energy to produce the alarm.

BACKGROUND OF THE INVENTION

My invention was out of love for the animal, the preservation of the animal, and the minimal chance of someone being injured.

I have never forgotten as a young child the sadness I felt when I was returning home from grocery shopping with my Grandmother. My grandparents lived at 11,000 feet on a mountain range, and animals were always luckily around. We approached a sharp turn in the highway and there in the road was a vehicle and a Buck, a male deer in the roadway struck by a vehicle. I was young and I still recall seeing the Doe, a female deer standing on the side of the highway looking back towards the buck with a small fawn at her side. I cried, I sobbed, and wondered why such a tragedy had to occur. I realize that the story of Bambi had been so powerful, and why it had such an impact, because we are reminded that death does occur and we control only our own actions. As I grew I wanted to figure out a solution, and my product came to me. I drove on a very busy travel way for animals crossing. I saw carnage daily on the roadway, many times multiple death of animals. Even though I believe that hunting and managing our wildlife is necessary, and monitoring the health of our animals is important, death from an animal vehicle collision did not need to be so prevalent. I thought about the technology the absence of needed product on the market to assist even after years of destruction. I wanted to find a solution in the direction that made sense. The animal alarm, my product the Animal Alarm AA-100, is that answer. Multiple arrays of monitoring travel, and documenting the animals that cross, with power from solar and battery, computer programming that consistently monitors and reacts.

FIELD OF INVENTION

My product was designed to assist in halting the travel of animals in front of a on coming vehicle.

My product design is based on alarming the animal, notifying the animal, warning the animal:

My product design triggers an alarm when an animal is approaching a roadway when danger is barreling down towards the animal.

Our highways are faster than ever before and we have products that alert the motorist, by signage, and we try to redirect the animals under highways, over highways with large expense and very minimal coverage.

My product design can cover 500 feet in every direction.

My product design can monitor animal crossing, document passing traffic, determine how effective it works by alerting the animal, by photo, by date stamp, and computer programmed to allow when it is not working at top peak performance.

My product design can help animals, motorists, costs from collisions, and animals to thrive and survive, as well as vehicle damage minimized from this possible wreckage.

My product design monitors, noise, motion, animal travel, and only alarms with the animal being able to hear it, and deter the animal from the oncoming traffic, and the animal can cross if no danger is present.

Figure 1:
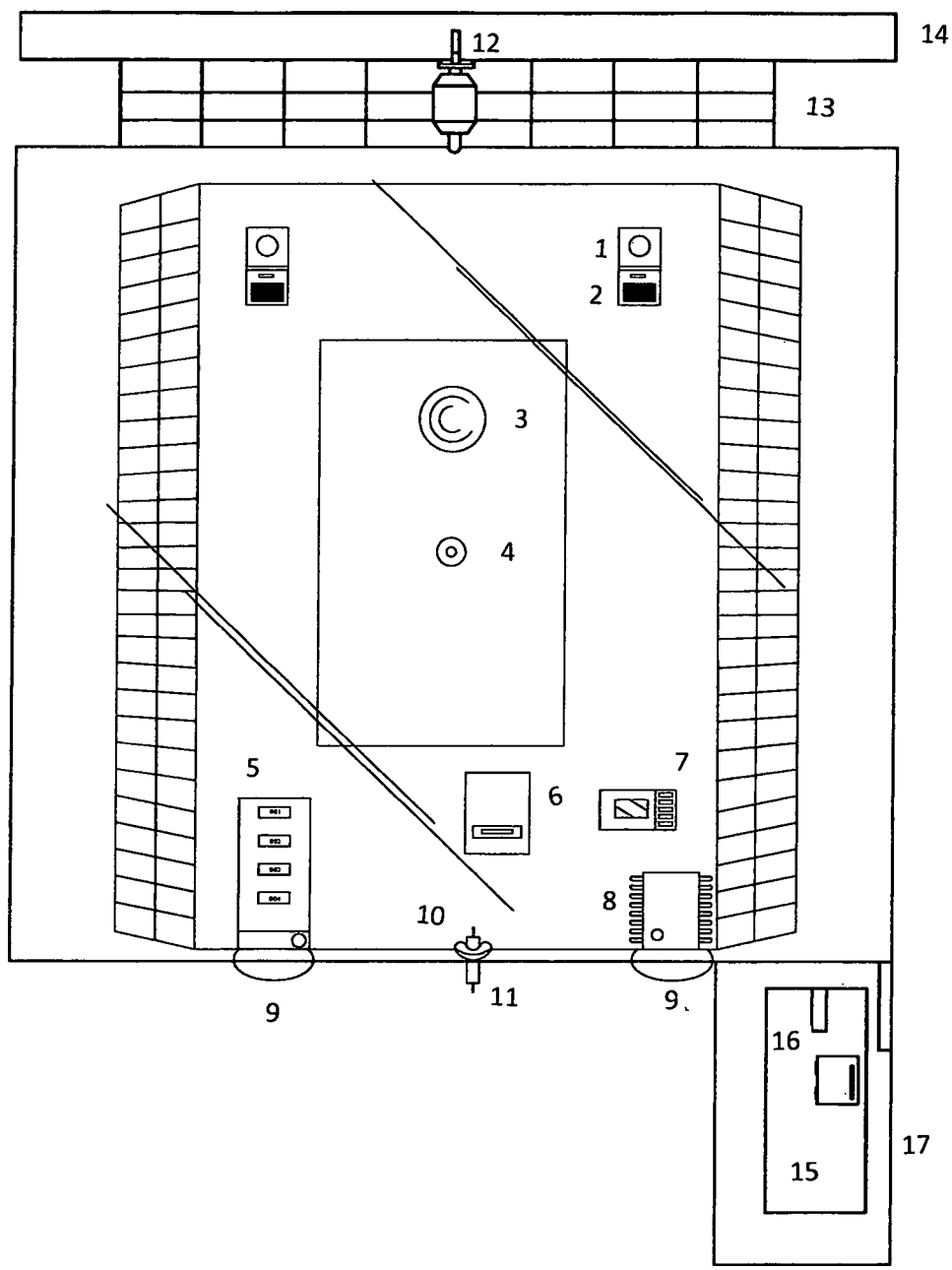
FIG. 1 and FIG. 2 are illustrations of the configuration of the animal alarm according to the invention.
Figure 2:
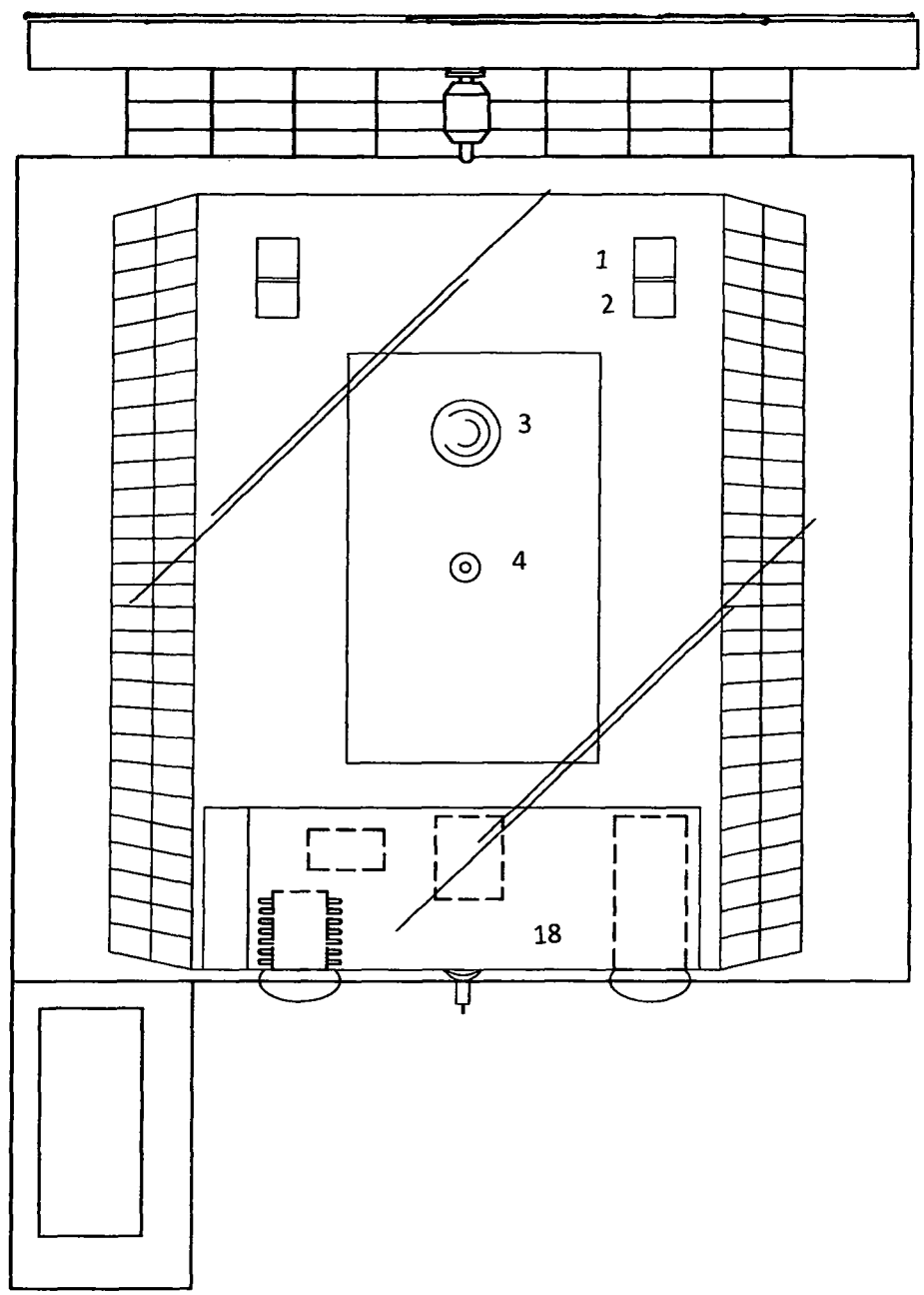

I have included a marked up version (correction required version)—DOC Code-REM of each illustration FIG. 1 Front, and FIG. 2 Back.

I have included a clean copied version—DOC Code-SPEC of each illustration FIG. 1 Front, and FIG. 2 Back.

I have included in the description of the drawings the inner working mechanics and detailed product capability for further understanding of the animal alarm and the function of the unit.

Each unit will is designed to follow a designated blueprint for the computer operation and animal alarm consistency.

Each unit will be designed to preform uniformly the same each and every time.

My drawings are general, and do not include breakdown of the unit inner workings. I have previously submitted how the computer is configured in writing format only. I have previously submitted how the unit will detect and project the required need for the animal alarm to sound. I have previously submitted how the unit is powered. I have previously submitted how the unit detects and documents the crossing of animals on the roadway.

BACKGROUND

The Animal Alarm AA-100 was designed with the animal in mind. The function is to address how the animal processes traffic and noise. In theory they do not identify the oncoming vehicle noise as danger, or do not react quickly enough once they realize the danger. The creation of the animal alarm, the silent alarm (unable to be detected from a human hearing factor) was alleviating a sounding device that created more irritability around an object that was to create safety. For years we have had different products from the human side of detection. I have observed that animals can learn and detect issues from noise, from an object that instinctively ties more to a repeated occurrence such as an alarm sounding to deter the animal from the location of the oncoming traffic and push it away from and defer it from wanting to cross. How do they detect noise? This was from a high pitch sound wave that generates movement towards their direction of travel. Is it fail proof? No. But will it make a large impact? Yes. I believe it will. Where will these units be stationed or placed? The heavy trafficked animal crossing areas of the highways.

The functioning products to date on the market are for the observation of motorists, or to deflect the animal from the roadway. To alter, and change the animal direction or pattern by going below or above the roadway. This is an expensive undertaking, and not easily achieved in all the areas that it is required to be effective.

SUMMARY OF THE INVENTION

The animal alarm was created from the animal point of view. This unit detects motion from the animal and the oncoming traffic. The animal alarm creates a barrier of protection by alerting the animal of the danger it is about to encounter. The animal is detected on the unit by the motion detectors, there are 4 (four), two in front and two in back, this is infra red imaging to capture travel. There is also 4 (four) motion detectors that trigger the camera, two on the front and two on the back. The animal is also recorded by picture of the approach and the alert given, if there is oncoming traffic. It also documents travel pattern and survival of the animal. It documents steady traffic patterns as well. There is 2 (two) cameras on the unit, one in the front, then one on the back. The animal alarm can be heard only by the animal ears, from a high pitch sound wave, that the human ear can not detect but the animal can be alerted from. The computer generates the alarm sounding when the noise detectors are triggered from oncoming traffic noise. Noise is detected from the bottom of the unit front and back detection, or side to side detection. The detection from noise also has a radar and microphone indicator in order to enhance the distance and capability of picking up the vehicle noise and travel speed.

How is the power generated to operate this unit? First and foremost is generated power from solar energy, with a battery back up to insure unit operation. There are 4 solar panels on each side of the unit, and 4 on top of the unit. The battery unit sits on the bottom of the unit to ensure without daylight, or without full power generated, the unit will still perform. In the event the unit is sensing failure, or data time lapse issues of data not captured. There will be an email generated to the individuals in charge to replace or charge battery. In instances that the unit fails a mapping program to identify the unit that failed as well as when it failed will generate an email to the individuals in charge. This recording information is to assist that when the unit needs assistance from weather, from any cause of damage or need. When it is not operating as designed it will alert the failure.

The unit is covered by a plexiglass casing. This is to alleviate the moisture from damage, keep the unit dry and performing correctly, as well as keep it from tampering or interference. The computer program for this unit can be viewed by up to 5 users. The data can be copied, transferred to a separate drive to store, or deleted with password approval. The top of the unit casing is at an angle of 45 degrees with copper transfer wiring within to keep the unit charging from solar panels as well as keep it from collecting snow, or ice. In the event a bird tries to build a nest, roost, remain on top of the unit, the alarm will sound to keep it from doing so. The copper wire has a fire retardant tube to protect the plexiglass, to function the heat to remove the snow or ice, or keep moisture from collecting on the top of the unit. How does it detect the moisture, the snow, the ice, the need to generate heat? The computer has a temperature monitor, a moisture and precipitation indicator, and will respond to perform this task.

How is the unit seen from the roadway? It sits on a pole to be capable to rotate 360 degrees. This covers location of an animal, detection of a vehicle, and to rotate with the sun's movement to gather solar to power the unit. The computer programming in this unit detects any failure to launch issue. If the camera does not record. If any part of the unit seems to be delayed, malfunctioning, or not being able to produce or function properly. The unit is mapped and identified as failing, and how it is failing, to the individual that is in charge.

The unit can operate 500 feet in any direction from it's post for monitoring, recording, detecting, and alarming. The unit does not alarm an animal unless danger is detected. The unit is unlike any other product on the market to date.

A few aspects of the unit to consider. The unit was designed to alleviate the crossing of an animal from the size of a skunk to the size of a Moose from crossing when a motor is detected in a close distance to the area. What I (the inventor) of the animal alarm was hoping to achieve, less carnage of animals, safety for the motorist and the animal. This can achieve safe crossing and continued travel patterns for the animals whether in times of mating, or seeking forage to survive. The vehicle animal collision can be ultimately minimized for less injury and less death.

DETAILS OF EMBODIMENTS OF THE INVENTION

FIG. 1 illustrate elements of the front view embodiment of the Animal Alarm AA-100. It indicates the assembled unit put in place to perform the tasks set forth in my invention. How it performs is generated primarily from the computer programming put in place to record, register data, and articulate reaction, detection, and execute an action. The unit has in place several safety features to regulate and maintain functionality. It produces energy from solar power primarily, and a battery back up system. In the event this does not produce enough energy to perform, it will send an error alarm and visual location of the unit to constructively correct the problem. The unit can function in all directions to obtain data. It can also function in all directions to deter an animal from crossing at the wrong timeframe. Explanation of that feature is thusly, an animal crossing towards the front of the unit on the other side of the road can sound an alarm with a vehicle approaching. It also can sound the alarm from the animal approaching from behind it, and beside it. The capability for it to detect movement, noise, and travel from animal and motor vehicle is from all directions. The discipline of the animal alarm AA-100 is formatted from a regimented blueprint of operation.

The critical element of each unit is consistency. Location of the product, traffic from animal and vehicle conflict are key to success of the need and discipline of the product.

FIG. 2 designates the back of the unit. An additional view to capture each direction of movement from an animal and a vehicle. The animal traffic has increased on roadways, thorough fares more consistently with the outlying forest areas being encompassed by urban living. The computer captures a picture of the animal, the time stamp and movement direction of the animal, as well as any oncoming or passing traffic. Within the scope and direction of the Animal Alarm AA-100 lies technology advances, updates, and continued capability of growth and adaptation. The unit design was created to achieve several intricate categories to document and record movement. The unit itself was designed to be 20"H×15" W×15" D, with the battery 8" H×4" W×4 D. The plexiglass outer casing is 33" H×22" W×22" D. That is safely contained from moisture, also protected from tampering by a security code locking mechanism.

The illustration of FIG. 1 and FIG. 2 do not encompass the detailed computer programming that operates and performs the detailed functionality of this invention. The description of this formatting has been previously indicated with detail of the output in productive data. The unit monitors all findings, good or bad, successful or destructive. Detailed performance and assisted characteristics of other programming could be enhanced with direction of findings reported from the original design of this unit.

The disclosure is presented for illustrative purposes and should not be interpreted as an exhaustive description of all embodiments of the invention. Specific elements illustrated or indicated can have alternative elements that would substantially increase functionality or enhance operation by redirecting and or upgrading the software of the unit.

Each figure represents the design elements required to house and construct a unit that creates the output the Animal Alarm AA-100 was intended to produce. The present invention is not limited to only those embodiments that include all of these features or benefits, other than the blueprint formulated to represent the inner workings of this Animal Alarm AA-100 workings.

LEGEND FOR FIG. 1

1 Motion Detector
2 Digital Reader—Detects crossing numbers, date stamp, traveling direction
3 Camera
4 Flash
5 Card Reader location
6 Card Reader Chip for photos
7 Heat sensor Temperature Monitor
8 Microchip Storage
9 Animal Alarm
10 Radar Detection
11 Micro phone—Noise Detection
12 Top Swivel to generate tilt when copper wiring produces heat for removing blockage from Solar energy
13 Solar panels
14 Plexi glass outer casing over unit is not shown
15 Battery Unit housing
16 Replacement Chip to sensor battery usage, storage, and strength
17 Outer Casing plexiglass not shown in FIG. 1 or FIG. 2

LEGEND FOR FIG. 2

1 Motion Detector
2 Digital Reader—Detects crossing numbers, date stamp, traveling direction
3 Camera
4 Flash
18 Access panel for Computer Computer Programming:

a. Data control of movement—dictating detection of surrounding possible danger from vehicles approaching when animal is present.
b. Noise detection—Triggered by vehicle engine sound to activate the silent alarm, in a high pitch whistle, Radar technology detection.
c. Motion detection of traffic and animals.
d. Whistle alarm—any direction—to sound off towards the approaching animal when a vehicle is within 500 feet.
e. Camera technology to record travel patterns of animals—has a back up detection from motion, to sound alarm.
f. Secondary alarm sound generator if first noise detection of oncoming traffic is not working efficiently, the motion and camera generates the secondary high pitch alarm to sound off.
g. Ultraviolet rays—infrared technology to be back up for oncoming cars and animals.
h. Solar panel energy—back up and extra energy generated by battery power.
i. Unit detects the location of noise, movement, when to sound alarm and/or record data with time, picture, animal, vehicle documentation.
j. Unit can turn 360 degrees able to read or detect animal movement, location, from ether side of the road. Unit can determine danger from collision with oncoming traffic detection.
k. Malfunction monitor if top of unit is covered by weather, turning on the heat sensor and not allowing it to damage the outer casing or internal unit. It will alarm that unit can not function constructively. It indicates low battery, maintenance required, or any malfunction from an animal not being detected.

Focus: Unit is covered by plexiglass outer casing, protecting it from the elements. All items easily replaceable for the re-usable chips for camera & motion detection. The motherboard encompasses, the detection to sound high pitch alarm, or detecting the vehicle noise and approach, as well as number of animals and cars passing unit. Standard battery back up the solar energy power.

The invention claimed is:

1. An animal alarm comprising:
a first camera located on a front of the animal alarm and a second camera located on a back of the animal alarm;
two infrared motion detectors located on the front of the animal alarm and two infrared motion detectors located on the back of the animal alarm, the infrared motion detectors adapted to detect a moving animal;
a microphone adapted to detect noise emitted by automobiles;
a radar detector adapted to detect moving automobiles;
two motion detectors located on the front of the animal alarm and two motion detectors located on the back of the animal alarm, the motion detectors adapted to activate one of the cameras based on detecting motion;
wherein an alarm is activated when (i) the microphone detects noise emitted by one or more automobiles, and (ii) one of the infrared motion detectors detect an animal.

2. The animal alarm of claim 1, further including a heat sensor.

3. The animal alarm of claim 2, further including a copper wiring encased in a fire retardant tube, the copper wiring adapted to heat up a top of the animal alarm to melt moisture when the heat sensor detects an outdoor temperature is below 34 degrees.

4. The animal alarm of claim 1, wherein the animal alarm is covered by a plexiglass box that has a 45-degree slope on top.

5. The animal alarm of claim 1, wherein the animal alarm is powered by one or more solar panels.

6. The animal alarm of claim 1, wherein the alarm creates a sound that is inaudible to humans.

7. An animal alarm adapted to placed near a road, the animal alarm comprising:
- a plexiglass box that has a 45-degree slope on top, each the following components being located inside the plexiglass box:
  - a heat sensor;
  - a copper wiring encased in a fire retardant tube, the copper wiring adapted to heat up a top of the plexiglass box to melt moisture when the heat sensor detects an outdoor temperature is below 34 degrees;
  - a first camera located on a front of the animal alarm and a second camera located on a back of the animal alarm;
  - two infrared motion detectors located on the front of the animal alarm and two infrared motion detectors located on the back of the animal alarm, the infrared motion detectors adapted to detect a moving animal;
  - a microphone adapted to detect noise emitted by automobiles;
  - a radar detector adapted to detect moving automobiles;
  - two motion detectors located on the front of the animal alarm and two motion detectors located on the back of the animal alarm, the motion detectors adapted to activate one of the cameras based on detecting motion;
- wherein an alarm is activated when (i) the microphone detects noise emitted by one or more automobiles, and (ii) one of the infrared motion detectors detect an animal.

* * * * *